Aug. 14, 1956     H. B. BREIT     2,758,383
CHAMFER GAUGE
Filed Feb. 3, 1953
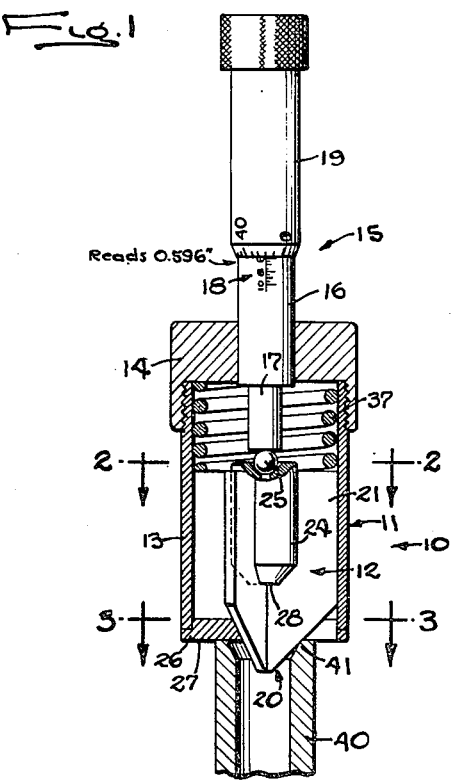
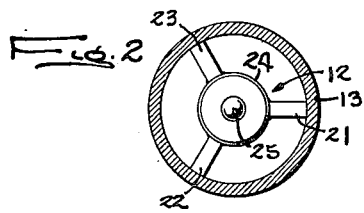
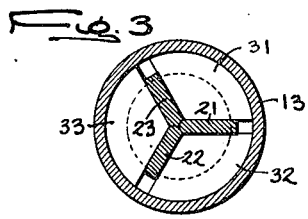
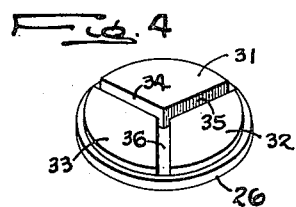
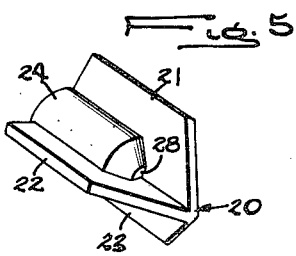
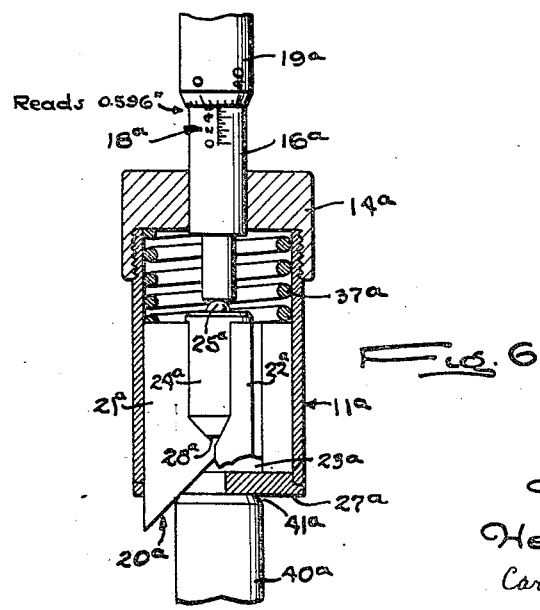
INVENTOR
Heinz B. Breit
Carlson, Pitzner, Hubbard & Wolfe
ATTORNEY

United States Patent Office 2,758,383
Patented Aug. 14, 1956

2,758,383

CHAMFER GAUGE

Heinz B. Breit, Chicago, Ill., assignor to Acme Industrial Company, Chicago, Ill., a corporation of Illinois Application February 3, 1953, Serial No. 334,900

1 Claim. (Cl. 33—178)

The present invention relates to gauges and more particularly to a gauge for measuring the diameter of a chamfer on a workpiece.

It is an object of the invention to provide a chamfer gauge in which the diameter of a chamfer is measured easily and quickly. It is another object to provide a chamfer gauge in which the diameter of a chamfer is measured accurately and directly in terms of dimensions customarily supplied on working drawings. It is a more detailed object to provide an improved chamfer gauge which is direct-reading.

It is a further object of the invention to provide a chamfer gauge which is capable of measuring a wide range of chamfer diameters and which may be adjusted down to a small fraction of an inch. It is still another object to provide a chamfer gauge which may be used on a workpiece having a very limited wall thickness.

It is an object to provide a chamfer gauge which may be easily adapted to measure the diameter of outside as well as inside chamfers. Finally, it is an object to provide a chamfer gauge which is simple and inexpensive, which is durable, maintaining its accuracy in the face of hard usage, and which requires little care or maintenance.

Other objects and advantages of the invention will become apparent upon reference to the following detailed description and drawing, in which:

Figure 1 is a vertical section of a chamfer gauge constructed in accordance with the invention.

Fig. 2 is a section taken along the line 2—2 of Fig. 1.

Fig. 3 is a section taken along the line 3—3 of Fig. 1.

Fig. 4 is a detail of the reference surface member.

Fig. 5 shows the gauge member in perspective.

Fig. 6 is a vertical section showing a modified form of the invention used for measuring outside chamfers.

While the invention has been described in connection with two preferred embodiments, it will be understood that the invention is not limited thereto and I intend to cover all embodiments and alternative constructions and uses falling within the spirit and scope of the invention as expressed in the appended claim.

Turning now to Fig. 1, the chamfer gauge is indicated generally at 10. It includes a housing or barrel 11 and a gauge member 12 which is of lesser length than that of the barrel 11 and is freely movable axially therein. In the present instance the barrel 11 is formed of a cylindrical shell 13 having a threaded end cap or closure member 14. Axially mounted within a central aperture in the cap 14 is a micrometer 15 preferably calibrated in terms of chamfer diameter. The barrel 16 of the micrometer is mounted so that the micrometer spindle 17 extends axially inward as shown. A rotatable thimble 19 cooperates with a scale 18 on the barrel.

Turning attention now to the gauge member 12, it will be noted that it is of fluted or finned construction, having a conical tip 20 and fins 21, 22, 23. These fins are brazed or otherwise secured to a central body portion 24 having an inner end and a stop surface 28 at its outer end. As shown in the accompanying drawings, the fins 21, 22, 23 are elongated and are axially arranged within the barrel 11 with their outer longitudinal edges snugly engaging and guided by contact with the inner surface of the barrel 11, the inner ends of said fins 21, 22, 23 terminating short of the inner surface of the cap or closure member 14, and the outer ends of said fins projecting outwardly beyond the reference surface 27, the outwardly projecting ends being formed in a conical locus having an angle greater than the angle of the chamfer to be measured. For example, the angle of the conical locus may be of the order of 90° whereas the angle of a conventional chamfer is usually of the order of 60°. Mounted at the inner end of the central body portion 24 is a spherical bearing surface 25 preferably in the form of a hardened steel ball bearing brazed in position. During the course of taking a measurement, the spindle 17 of the micrometer is screwed into contact with this bearing surface.

In accordance with the invention, the end of the gauge mounts a reference member 26 having a reference surface 27 which faces axially and which extends radially inward between the fins 21–23 of the gauge member. Preferably, the reference member 26 is in the form of a disk having three inwardly extending sectors 31, 32, 33, the disk being pressed or brazed in position at the outer end of the barrel. The sectors 31–33 taken together define a Y-shaped opening having symmetrically arranged legs or slots 34, 35, 36, respectively, in and through which the fins of the gauge member are freely slidable.

The gauge member is normally pressed outwardly relative to the barrel by means of a coil spring 37 having a relatively low rate, and maximum outward movement of the gauge member is limited by contact between the unslotted portion of the inner surface of said reference member and the stop surface 28 on the body portion 24 of the gauge member. The outer ends of fins 21, 22, 23 which are shaped to form the conical locus normally extend outwardly through the slots 34, 35, 36, respectively, and beyond the reference surface 27.

The advantages of the above arrangement will be apparent upon inspection of Fig. 1 where the gauge is in contact with the chamfered end of a small tubular workpiece 40 which has been forcibly engaged with the reference surface 27, the lip of the chamfer being indicated at 41. In conventional working drawings, the chamfer is specified in terms of the diameter of the lip 41 and it is this dimension which is measured by the present gauge. In use, the gauge is abutted against the workpiece or the workpiece is forcibly engaged with the reference surface 27, the thimble of the micrometer having been previously unscrewed an appropriate amount. As the two members are brought together, the spring 37 is compressed and the lip 41 on the workpiece is engaged by the outwardly projecting ends of all three of the fins 21–23 which ends constitute the conical locus on the outer end of the gauge member, thereby insuring that the workpiece and gauge are precisely centered with respect to one another. The degree of outward projection of the conical locus formed by the ends of fins 21, 22 and 23 is determined by contact between the said conical locus and the lip of the chamfer in contact with the reference surface 27 when a workpiece having a chamfer thereon is forcibly engaged with said reference surface. The thimble 19 of the micrometer is then screwed down so that the spindle 17 touches the inner or bearing surface on the inner end of the gauge member. The gauge and workpiece may then be separated for convenience in reading the scale 18.

It is to be particularly noted that the inward extension of the reference surface 27 between the fins enables the gauge to be used for measuring chamfers on workpieces having extremely small diameter. For example, in the drawing the workpiece 40 has a diameter which is only about half of that of the reference surface 27.

In practicing the invention, conventional micrometers may be used, the zero point of the scale being so located that the micrometer reads zero when the gauge member 12 is fully retracted, and when the theoretical tip of the conical locus on the gauge member coincides with the reference surface 27. This may be accomplished using a commercial micrometer simply by adjusting the position of the micrometer barrel in the cap 14, or by adjusting the effective length of the gauge member 12. The procedure employed for "setting zero" is a matter well within the capabilities of one skilled in this art.

Having set the zero point, the reading of the scale graduations may be multiplied by a constant factor in order to obtain a reading in terms of chamfer diameter. The multiplying factor is given by the expression 2 tan $\theta/2$, where $\theta$ is the included angle of the conical end surface on the gauge member. I prefer to use an angle $\theta$ of 90° since this gives a simple multiplying factor of 2. Furthermore, an angle of 90° is practical since chamfers generally have an angle which is more acute than 90° generally of the order of 60°, with the result that contact takes place at the lip rather than at the root of the chamfer. In order to make it unnecessary to use of multiplying factor where $\theta=90°$, a standard micrometer may be readily converted for use in the present device by deleting the original scale numerals and by using numerals which are twice as great. This causes the scale to be effectively "contracted" in the ratio 1:2 and is mathematically equivalent to using a multiplier of 2. This has been done in the case of the gauge shown in the drawing (Fig. 1) where the reading indicates a chamfer diameter of 0.596 inch.

While the device described above is intended for measuring inside chamfers, it is one of the features of the present invention that the same basic construction may be employed for measuring outside chamfers by substituting a gauge member having an internal rather than an external conical locus. In the embodiment shown in Fig. 6, similar elements are indicated as in Fig. 1 with the addition of a subscript "a." In this figure the gauge is in contact with a workpiece 40a having an outside chamfer terminating in a lip 41a. The zero point of the micrometer scale is set just as in the case of the previous embodiment. The scale 18a, however, runs in a direction opposite to that of scale 18 since inward movement of the spindle indicates decreasing rather than increasing chamfer diameter. The diameter of the lip 41a is the same as the diameter of the lip 41 in Fig. 1 and the two micrometer readings are therefore the same.

Where it is desired to use cone angles greater or less than 90°, this may be done provided that the scale is contracted in the ratio 1:2 tan $\theta/2$.

The present gauge makes it unnecessary to employ more expensive time-consuming and often indirect methods of measuring chamfer diameter. In many tool rooms and machine shops, optical equipment for making a direct measurement is frequently located at some distance from the shop facilities and may be tied up in making other more important measurements. One common method of measuring internal chamfers has been to place a ball bearing of known diameter into the chamfer, the chamfer diameter being calculated from the amount the ball extends above the workpiece. This and similar methods, however, are indirect, are of questionable accuracy, and have required computations which involve a possibility of error. By contrast, the present device provides means for easily and quickly making a measurement which is direct and reproducible, a measurement which is in the same terms as given in working drawings, and which is therefore used by government and other inspectors.

With the bearing and work-contacting surfaces appropriately hardened, the gauge may be employed for long periods of time with a high degree of accuracy. The accuracy may be checked at any time simply by inserting the gauge into a workpiece which has previously been calibrated by optical means.

The other advantages of the chamfer gauge including simplicity, cheapness and durability will be apparent to one skilled in this art.

In the following claim, the term "barrel" is a general term covering any suitable means for slidable mounting of the gauge member, and the term "conical locus" includes both internal and external cones.

While the fins 21–23 on the gauge member 20 and the cooperating slots 34–36, in the reference member 26 are relatively narrow in the present embodiment, it is understood that their thickness may be increased, if desired, without departing from the present invention.

I claim as my invention:

In a gauge intended for manual portability and manipulation for measuring the diameter of a chamfer of predetermined angle formed on a workpiece, the combination comprising a cylindrical barrel; a reference member secured to the barrel and extending across one end thereof, said reference member being of disc shape and having a plane, external, axially facing reference surface with a plurality of symmetrically arranged, radially extending slots formed through said reference member and the reference surface thereof; a closure member having a central aperture therein and secured to the other end of said barrel; a gauge member having a body portion of lesser length than the length of said cylindrical barrel and freely movable axially within said barrel and having an inner end and a stop surface at its outer end, said stop surface adapted to contact the unslotted inner surface of said reference member to limit the maximum outward projection of said body member with respect to said barrel, said body member having a plurality of elongated, axially disposed and symmetrically arranged radial fins mounted thereon with their outer longitudinal edges snugly engaging and guided by contact with the inner surface of said barrel, the inner ends of said fins terminating short of said closure member and the outer ends of said fins extending outwardly beyond the stop surface of said body portion and through the slots in said reference member and outwardly beyond the reference surface thereof, said outwardly projecting ends being formed in a conical locus having an angle greater than the angle of the chamfer to be measured, the degree of outward projection of said outwardly projecting ends beyond said reference surface, when less than the degree of projection afforded by engagement of said stop surface with the unslotted inner surface of said reference member, being determined by contact between the conical locus of said projecting ends and the lip of a chamfer in contact with said reference surface when a workpiece having a chamfer thereon is forcibly engaged with said reference surface; a compression spring in said barrel between the inner ends of said fins and said closure member to resiliently retain said stop surface in contact with said reference member and to resiliently oppose inward movement of said gauge member; and a micrometer calibrated in terms of chamfer diameter and having a barrel fixedly mounted in the central aperture of said closure member, said micrometer including an axially extending micrometer spindle slidably and adjustably mounted within the barrel thereof and having an inner end within said cylindrical barrel in axial alinement with the inner end of the body portion of said gauge member to engage said inner end for measuring the degree of outward projection of the fins of said gauge member with respect to said reference surface, the said degree of outward projection of said fins denoting the diameter of the lip of the chamfer on the workpiece undergoing measurement.

(References on following page)

References Cited in the file of this patent

UNITED STATES PATENTS

| | | |
|---|---|---|
| 763,076 | Spalding | June 21, 1904 |
| 1,459,896 | John | June 26, 1923 |
| 1,922,758 | Christopherson | Aug. 15, 1933 |
| 2,358,749 | Volis | Sept. 19, 1944 |
| 2,550,508 | Wiedemer | Apr. 24, 1951 |
| 2,553,755 | Dietert | May 22, 1951 |
| 2,632,955 | Samuelson | Mar. 31, 1953 |
| 2,687,575 | Acton | Aug. 31, 1954 |

FOREIGN PATENTS

| | | |
|---|---|---|
| 802,103 | Germany | Feb. 1, 1951 |